Sept. 4, 1928.
B. C. STICKNEY
1,683,582
TYPEWRITING MACHINE
Filed July 7, 1925
Fig. 1.
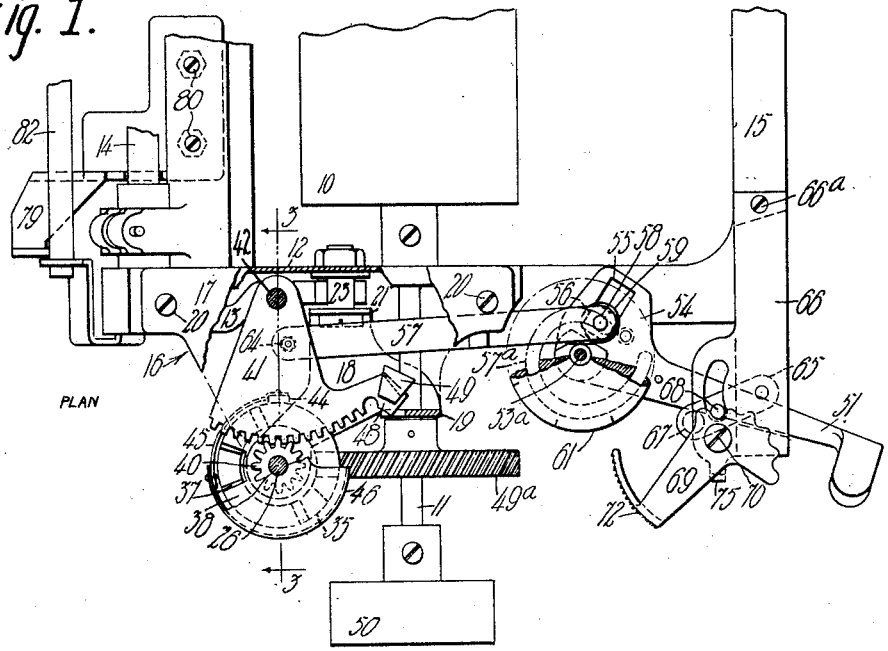
Fig. 2.
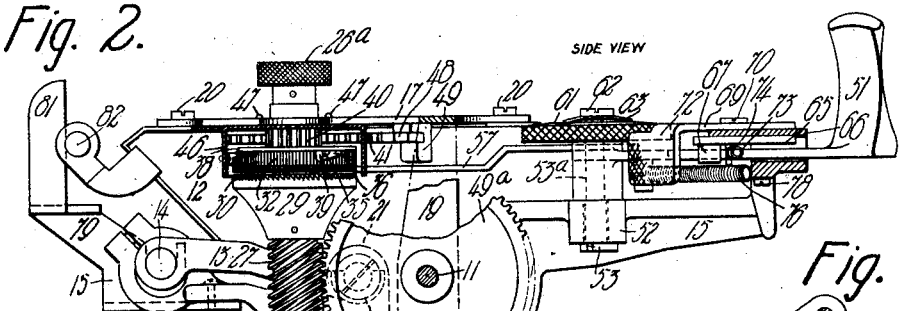
Fig. 3.
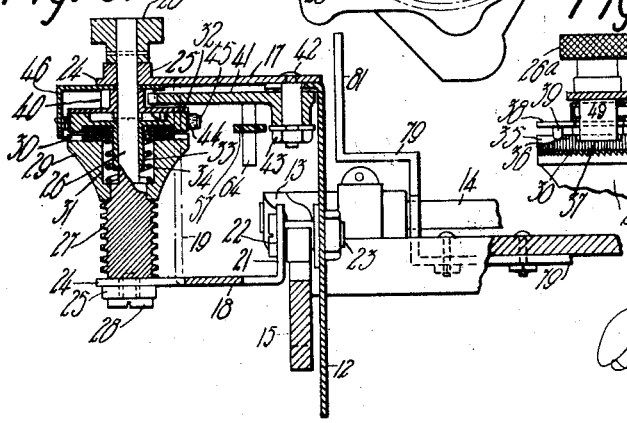
Fig. 4.
Fig. 5.
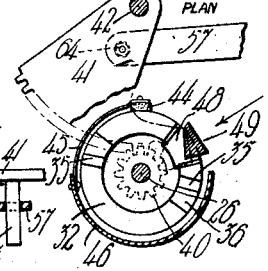
Inventor:
Burnham C Stickney Patented Sept. 4, 1928.

1,683,582

UNITED STATES PATENT OFFICE.

BURNHAM C. STICKNEY, OF PORTSMOUTH, NEW HAMPSHIRE, ASSIGNOR TO UNDERWOOD ELLIOTT FISHER COMPANY, OF NEW YORK, N. Y., A CORPORATION OF DELAWARE.

TYPEWRITING MACHINE.

Application filed July 7, 1925. Serial No. 41,933.

This invention relates to line-feeding mechanism for typewriting machines. Many of the features are especially useful in connection with revoluble platens.

One of the features of the invention is the provision of a simple and practicable line-feeding mechanism which will permit not only single, double and triple line-spacing, for the usual purposes, but which will also permit additional regulation for the intermediate or fractional positions of 1½ and 2½ line-spaces, thus giving a range of five possible line-space movements, instead of the usual three.

Another feature of the invention is the provision of simple means suitable for adoption as standard for regular use, for effecting minute variations in the extent of the line-spacing movement. It is a further object of the invention to accomplish this result while permitting the platen stroke to be regular for either 1, 1½, 2, 2½ or 3 times the distance or basis that is determined by the fine regulation, but without losing such fine regulation. In other words, it is an object to enable the operator to determine by micrometer mechanism the basis for line-spacing, and then to regulate the number of spaces (multiples of said basis) through which the platen is to be spaced, with provision for the half or fractional spaces already mentioned.

An additional feature is the provision of means for effecting fine adjustments of the platen to adjust the work-sheet to exact printing position, as, for example, in typing upon ruled lines. This is done without altering the micrometer adjustment.

Another object of the invention is to make it feasible to dispense with the complicated mechanism which usually releasably connects the platen to the ordinary line-space wheel; and still another object is to dispense with the use of the device which usually throws off the line-space detent and applies a brake to the platen.

To gain these and other advantages, there is provided for the platen a driving rack, which is illustrated in the form of a wheel; and meshing with this wheel is a worm, rotation of which effects line-feeding of the platen; the worm being constantly in mesh with the worm-wheel during the line-feeding movements. For driving this worm by the usual carriage-returning handle, a pinion is preferably connected to the worm, and a rack which meshes with the pinion is connected to said handle, so that, as the operator returns the carriage to begin a new line, the rack drives the pinion and the pinion turns the worm and thereby revolves the platen. The worm may be provided with a fine pawl-and-ratchet or other suitable universal clutch mechanism to permit the rack to return idly to normal position, and then to drive the platen from any position thereof.

A micrometer adjustment is provided for determining the basis of the line-spacing movements, so that said basis, whose usual minimum is one-eighth of an inch, may be varied to any extent within a large range. Said basis having been determined, an additional or multi-space regulating stop mechanism is set independently, to different mechanically-located stations, to determine whether the platen shall rotate 1, 1½, 2, 2½ or 3 times the extent determined by said basis. This multi-space regulation is effected without altering or losing the adjustment that has been effected by the micrometer mechanism. Each adjustment may be effected independently of the other; one adjustment being preferably at one end of the stop train, and the other adjustment at the other end, or intermediate the line-space handle and the train.

The worm may be provided with a thumb-wheel, whereby it may be independently rotated for effecting fine adjustment of the platen upon special occasions, as, for example, when bringing a ruled work-sheet to exact typing position. It will be understood that the line-space mechanism will pick up the platen from any position thereof, making it unnecessary to attend to the disconnecting and re-connecting of the line-spacing mechanism or platen detent mechanism as heretofore. There is nothing to do but to rotate the platen to bring the sheet to typing position, and after that to simply operate the line-spacing handle for the usual purpose.

A further advantage gained is that the platen, since its line-space movement is always or nearly always an aliquant part of a revolution, does not become indented by reason of the types repeatedly striking in the same places.

In the development of the present invention, the platen is rotated by a pair of spiral gears, the larger gear thereof being fixed to the platen-shaft outside the carriage-end, and the smaller gear or pinion formed with a spindle to carry a ratchet toothed element, forming one part of a two-part interlocking clutch, the two parts thereof being normally separated and inoperative, but are brought into operative relation by the initial movement of the line-space lever. The second clutch-element thereof carries a pinion driven by a gear-sector pivoted on the frame and operated by a bar connection to one arm of a bell-crank pivotally secured to the line-space lever and adjustable thereto. This whole mechanism is assembled outside the carriage end frame, where adjustment may be made without dismantling the platen from the carriage.

Interlocking ratchet-toothed-elements are employed as a clutching medium between the line-space lever and the platen, forming a one-way drive. To avoid overthrow of the platen and to avoid placing the fine interlocking teeth of the clutch-members under undesirable strain, the invention provides upon the sector (that drives a pinion secured to the movable clutch-member) a stop-element to arrest the stroke of the line-space lever by striking the face of the pinion. There is also provided a filler-block timed to enter a gap in the top face of the movable clutch-member, at the completion of the line-spacing movement of the platen, which, by filling up the space between the bottom of the gap and the under face of the supporting frame, effectively locks the movable clutch-element against rising out of engagement with its associated clutch-element that is connected to the platen, and overthrow of the platen is prevented.

The line-space lever being mounted upon the carriage-frame, and the line-spacing stop being on the light platen-frame, more or less torsional stress will be transmitted to one end of the platen-frame relatively to the carriage, at each line-spacing operation. To avoid faulty operation from this cause, a support on the carriage is arranged to bear against a part of the platen-frame in such a manner as not to interfere with the case-shifting movement of the platen, but so as to effectively check any rearward distortion of the light and weak platen-frame during a line-spacing operation that might effect the fine, close adjustment of the co-operating clutch-members, etc.

Another feature of the present invention provides for the factory assembly and adjustment of the platen-driving and complicated interlocking clutch-elements within a retaining bracket or frame that can be attached to the platen-frame as a complete unit.

Other features and advantages will hereinafter appear.

In the accompanying drawings,

Figure 1 is a plan view of the line-spacing mechanism, assembled to the left-hand carriage end of an Underwood machine, showing the several parts in operative relation for a line-spacing movement, with some of the parts broken away to expose other parts underneath.

Figure 2 is an end view of Figure 1, with some of the parts broken away and others omitted.

Figure 3 is a cross-sectional view through Figure 1 on a plane indicated by the line 3—3 and looking in the direction of the arrows.

Figure 4 is a fragmentary plan view, illustrating the manner of arresting the line-spacing lever at the end of its stroke, and also showing in section the element carried by the gear sector, to lock the platen-clutch members at the end of a line-spacing movement.

Figure 5 is a side view of the parts shown in Figure 4, looking in the direction of the arrow.

The usual Underwood cylindrical platen 10 is secured to a platen-shaft 11, journaled in the ends of a platen-frame 12, suspended at each end upon arms 13 pivoted at 14 to the carriage-frame 15 to provide an up-and-down shift movement of the platen-frame within the carriage-frame for typing upper and lower case characters.

The invention is illustrated in connection with an Underwood front-strike typewriting machine, in which the revoluble platen 10 is provided with a worm-wheel $49^a$, and in mesh therewith is a worm 27, which is revolved intermittently by means of a line-spacing and carriage-returning lever 51 mounted upon the typewriter-carriage 15. Said line-spacing lever has a part which performs the function of a short transmitting arm, which is connected by a link 57 to reciprocatory means for imparting movements to said worm 27. Said short arm has an adjustable device for varying the effective length of the arm, whereby variations may be effected in the length of the line-spacing unit. Said reciprocating means may include a sector 41, and a pinion 40 meshing therewith and rotated to and fro thereby. This pinion in turn drives one member of a clutch, the companion member 30 being fixed to said worm 27 to drive the same. The clutch may be normally open, Figure 2, but it is automatically closed at the initial portion of the movement of said line-spacing lever 51, so as to drive the worm-wheel and platen.

The driving stroke of the line-spacing lever is limited by the act of throwing a stop or check-dog 48 into the pinion 40; but upon its return to normal position, the line-space lever is arrested by an adjustable line-space regulator, whereby there is secured a multiple spacing, that is, one or more line-spacing units (including 1½ and 2½ line-spaces), without disturbing the setting of micrometer mechanism which is carried by said short arm of said line-spacing lever.

The worm, clutch and pinion, etc., are mounted compactly upon a bracket or frame 16 forming a manufacturing unit, and for convenience the details of this unit will be first described. This bracket may be formed from sheet-metal to include a top 17 and a bottom 18, the two joined by a strap or yoke 19. The top 17 is secured by screws 20 to the left-hand carriage end. The bottom 18 has an ear 21 to further secure the frame to the carriage by a screw 22 threaded into the end of a stud 23 that hangs upon the forward end of one of the arms 13.

The two sections 17 and 18 may be provided with bosses 25 to provide bearings for a vertically disposed spindle or shaft 26. The spindle 26 may be formed integral with the platen-driving spiral pinion or worm 27, the end face thereof bearing against the upper face of the frame section 18, and to prevent displacement thereof a screw 28 may be threaded into the lower end of the shaft. The upper end of the pinion 27 may be shouldered down and a clutch-member 29 secured thereto in any suitable manner to rotate with the pinion or worm 27. This member 29 flares outwardly above the worm 27, to afford an enlarged diameter of the clutch, and this face may be recessed centrally to form the outer annular rim 30 through which rather fine, radial ratchet-teeth may be cut. More teeth may be employed because of the enlarged diameter, and each tooth means less angular movement, thus approximating a universal friction clutch in fineness of regulation of the line-spacing movements of the platen. This member 29 is further recessed to form a retaining chamber 31 for a clutch spring, as will presently appear. Making the worm or spiral pinion 27 separate from the clutch-member 29 is preferable, because it provides that said clutch-member may be hardened to increase the effective life of the fine, sharp-pointed teeth thereon, while the pinion and shaft may function better in a somewhat softer state. One clutch-member (29) may be permanently fixed to the pinion 27 and to shaft 26, but the co-operating or driving clutch-member 32 will be hereinafter referred to as the loose clutch-member, inasmuch as it is loosely mounted on the shaft 26 and has sliding and rotary movements independent of the fixed clutch-member 29. It will be understood that the loose clutch-member receives its driving movement from the pinion 40 connected thereto, said pinion being driven by the sector 41, which receives its movement through link 57 on the line-spacing lever or bell-crank including the handle 51, and it will be presently seen that as the handle starts it causes the clutch to close, and thereafter the platen is rotated by means of the worm 27 and worm-wheel 49ª throughout the remainder of the stroke of the handle 51 until the stop-tooth or check-dog 48 on the sector 41 swings into mesh with the teeth of the pinion 40; and it will also be seen that upon release of the handle 51, it is spring-returned to normal position, and during this return the platen remains stationary, together with the worm-wheel 49ª and the worm 27 and the clutch-member 29 that is fixed thereto; while the upper or loose clutch-member, which is permanently connected to the handle 51, is returned therewith.

Further considering the details of the unit which comprises the sector, pinion, clutch and worm-wheel, it will be noted that the loose clutch-member 32 includes a disk equal in diameter to the fixed member 29 and recessed on the lower face to form an annular rim through which fine radial ratchet teeth are cut. The teeth of the two clutch-members are cut in right and left hand relation for an interlocking co-operation to form a one-way driving mechanism, but operate as a ratchet escapement in the return direction. It is desirable to provide a long bearing for the loose clutch-member 32 upon the shaft 26, and said member includes a sleeve 33 that extends downwardly within the chamber 31, and is normally held in a raised position where the teeth thereof stand clear of the teeth of the fixed clutch-member 29 by a spiral spring 34 compressed between the bottom of the chamber 31 and the under face of the member 32. The spring serves partly as a drag to prevent rotation of the member 32 independently of the shaft 26 and the member 29 for purposes presently to appear. This prevention of rotation of member 32 is desirable at the initial portion of the driving stroke of the line-spacing handle 51, so that the loose clutch-member will descend properly into mesh with the fixed clutch-member, so as to prevent the upper clutch from slipping around and skipping the teeth of the lower clutch, it being desired to secure a full line-space movement of the platen.

The upper face of the loose member 32 may be recessed centrally to form an annular rim and two open gaps or cavities 35 are cut through the rim diametrically opposite each other and formed to provide camming faces 36, and adjacent one of these cam recesses a third gap 37 is cut through the rim to co-act with a clutch-locking element presently to be described.

The details of the means for securing the automatic closing of the clutch at the beginning of the operation of the line-spacing handle 51 will now be described. The loose clutch-member 32 normally is free to rotate independently of the fixed clutch-member 29 through the lifting action of the spring 34, and to bring the two clutch-members into co-operation, a disk 38 is loosely mounted upon the shaft 26 to normally lie flat against the upper face of said member 32, and provided with round-nose pins 39 positioned to enter the cam-cavities 35 and engage with the deepest end thereof. To rotate the disk 38, the pinion 40 is secured thereto to fill the space on the spindle between the disk and the bracket section 17, and the pinion may be rotated by the gear sector 41 fulcrumed to the under face of the bracket section 17 upon a stud 42 and held thereon by a check-nut 43.

When the parts are conditioned as shown at Figure 2, the pinion may rotate the disk 38 in a counter-clockwise direction. The loose clutch-member 32 may be provided with a slight resistance or drag to prevent a free rotation thereof, so that the two pins 39 will climb the stationary inclined faces 36 in said loose clutch and force the loose clutch-member promptly downward, so that the teeth on the under side thereof engage with the teeth on the top side of the fixed clutch member 29, and when this interlock between the teeth is complete, the two pins 39, resting upon the inclined faces 36 of the cavities 35, will become driving elements to rotate the clutch and spindle.

The teeth of the two clutch-members are very fine and have a ratchet or saw-tooth formation, and while this is the preferred form for a one-way driving transmission, it will be apparent that with the clutch-locking element presently to be described any other form of tooth will be equally effective.

The spring 34 within the chamber 31 performs a double function, that of normally holding the clutch open, and also serving as a drag to oppose premature rotation of the loose member 32 at the start of the line-space handle 51. The spring 34 primarily raises the loose clutch 32 out of engagement with the lower member 29, and aids also in opposing said premature rotation of 32. To further oppose such premature rotation, member 32 is formed with a knurled periphery, as shown; and a brake, preferably in the form of a pad 44, bears against this roughened surface at all times, under the pressure of a flat spring or bow 45, to one end of which the pad is secured. The other end of the spring or bow 45 is secured to the rigid inner wall of an inverted cup-shaped cover-piece 46, that may be permanently secured to the under face of the section 17, as by rivets 47. In this manner the drag against the loose member 32 is made effective. The tension or opposition to be overcome during the downward movement of the loose member 32 is reduced to a minimum through the employment of the very light spring 34. From this it will be evident that upon the start of the handle 51, the pins 39 swing against the cams 36, camming downwardly the loose clutch member with little, if any, premature rotation thereof, thus closing the clutch at once; such premature rotation being opposed by the pad 44 aided by the vertical scores 32, which, because of their vertical arrangement, do not co-operate with the pad 44 to oppose seriously the descent of the clutch-member, but do co-operate therewith to oppose premature rotation of said clutch member. It will also be seen that after the clutch is closed, the handle 51 throughout the remainder of its movement drives the platen.

The shaft 26 extends above the face of the section 17, and the free end is provided with a knurled finger-piece 26$^a$ for rotating the shaft and spiral pinion 27 independently of the clutch-member 32, to effect fine temporary adjustments of the platen in adjusting a line on the work-sheet to the usual platen-scale (not shown); this device enabling the operator to bring the sheet at once to correct typing position; and wherever the sheet is brought, the line-spacing movements begin from that point, without further adjustment at any time, and without any further setting of any devices. This device 26$^a$ is also an advantage in writing fractions and exponents and in other places where it is desired to write a numeral or character a little above or a little below the line of writing.

There will now be described the device which arrests the line-spacing train at the completion of the drive of the handle 51. The toothed sector 41 has stop-member 48 formed therewith to limit the movement of the sector in its driving direction to line-space the platen, by striking the face of the pinion 40, thus providing a stop position that is uniformly the same under all forms of line-space movements. This stop-member 48 carries a space-filling block 49 that swings towards the pinion and is timed to enter the cavity or gap 37, and when said stop-member 48 strikes the face of the pinion 40, said block will have entered the gap 37 with the lower edge resting against the bottom face of the gap in the top edge of the loose clutch-member 32 and the upper edge thereof in contact with the under face of the bracket section 17, as clearly shown in Figures 4 and 5. At the end of the movement of the sector 41, the loose clutch-member 32 becomes positively locked into toothed engagement with the fixed clutch-member 29 to prevent platen overthrow, or independent movement between these two clutch-members.

It will be noticed that the foregoing detailed description includes a mechanism that may be assembled and finally adjusted within the bracket sections 17 and 18. It may be adjusted to the carriage end as a unit, by the setting of only a few screws, either at the factory or in the repair field.

The driving connection includes the platen-shaft 11, projecting from its bearing in the left-hand carriage end, and the spiral gear 49$^a$ secured thereto for engagement with the spiral pinion 27. The transmission of motion from the pinion 27 to the gear 49$^a$ tends to spring the platen-shaft 11 out of alignment; but to preserve the proper alignment of said shaft and to maintain close fitting running engagement between these two spiral gears, the yoke 19 may be positioned relatively to the two bracket sections 17 and 18 to provide a bearing for the shaft 11 adjacent the gear position thereon. The free end of the shaft 11 may be provided with the usual finger-knob 50 for forcing the platen to rotate in either direction at will as far as desired and independently of the line-spacing lever 51.

The details of the driving connection from the line-space lever 51 to the pinion-driving sector 41 will now be described; this mechanism including the micrometer device for adjusting the length of the line-space unit. The line-spacing lever 51 is fulcrumed to the usual lug 52 of the carriage end as upon a screw 53 threaded therethrough with a section 53ª projecting above the face of the lug to pass through a barrel section of the line-space lever. The lever 51 is formed with a lug 54 adjacent the fulcrum of the lever, and within this lug a rectangular opening 55 is provided to receive a square block 56 for a limited microscopic sliding adjustment within the opening towards or from the fulcrum of the lever. The block 56 has a pivotal connection to one end of a link 57, and by adjusting or setting the block within the opening 55 towards or from the axis of the lever 51, minutely variable movements may be transmitted to the link or push-bar by the line-space lever.

The connection between the block 56 and the bar 57 consists of a stud 58 formed with a thin flange 59 intermediate its length that divides the stud into two straight shank sections, one on either side of the flange; one shank to be driven through a central hole in the block 56 up to the flange, and the other shank section passing through a pivot hole in one end of the bar 57 to project above the face thereof and enter a spiral groove 60 formed in the under face of a knurled, graduated disk 61, rotatably mounted upon the free end of the fulcrum screw 53 and held under tension against the line-space lever 51 by a spring 63 compressed by the screw 62 threaded into the end of the fulcrum screw 53. The opposite end of the push-bar 57 has a pivot hole therethrough to receive a stud 64 riveted to and extending downwardly from the under face of the sector 41 a sufficient distance to maintain operative connection with said bar at both case-shift positions of the platen. The stud shifting up and down with the platen frame, the pivot hole through the bar 57 is made slightly larger than the diameter of the stud 64 to provide for a free shifting movement of the stud without cramping.

The flange 59 of the stud 58, as may be seen at Figure 1, overlaps the edges of the opening 55 to retain the block 56 within the opening 55, and provides for the simple assembly between the line-space lever 51 and the gear sector 41 of dropping the block 56 into the opening 55 adjusting one end of the connection 57 to the stud 58 and the other end to the stud 64, and adjusting the disk 61 to the screw 53 with the stud 58 within the spiral groove 60, and the lower face of said disk bearing against the face of the bar 57 and the line-space lever 51, and finally threading the retaining screw 62 into the end of the fulcrum screw 53.

It will be understood that by rotating the thumb-wheel 61, the snail cam groove 57ª is revolved, since said groove is made in the under surface of said finger-wheel 61. This shifting causes a change in the position of the driving stud 58 of the link 57. Hence the stud may be set to minutely variable distances towards and from the axis 53ª of the line-space lever, and hence the stroke of the link 57 may be varied within wide limits, but the variation may be microscopic at any point to secure any desired line-space unit. When the stud or rest 58 is once set, it will remain independently where it is set and will need no attention during the usual typing and line-spacing operations, but when it is desired to reset it, to lengthen or shorten the line-spacing unit, it is only necessary to revolve the thumb-wheel 61 accordingly. The friction spring 63 holds the thumb-wheel against accidental rotation.

The mechanism thus far described provides for a line-spacing movement of unit distances, and to provide multiples of the unit distance, means are mounted upon the carriage to vary the initial position of the line-space lever. This mechanism includes a lever 65 pivoted to a plate 66 secured to the carriage-frame by screws 66ª; said lever carrying a stud 67 to engage the line-space lever as an adjustable stop. To vary the position of said stud 67 relative to the line-space lever, a stud 68 projects from the top face of the lever 65 to pass through a slot in the plate 66 and engage with a lever 69 fulcrumed at a screw 70 on the plate 66 and formed with a series of spirally arranged detents 71 within one of which the stud 68 will nest. These detents for the stud 68 may be inscribed to indicate multiples of a unit line-space distance that the line-space lever may be set to, and to facilitate shifting of the detents relatively to said stud, a thumb-piece 72 with a knurled face is provided. To maintain the stud 68 within a detent, a spring 73 is adjusted between a pin 74 on the under side of the lever 65 and an ear 75 on the plate 66.

To restore the lever 51 and the parts connected thereto, a spring 76 is employed, having one end secured to a stud 77 on said lever, and the other end attached at any convenient place on the carriage-frame, as by a screw 78.

The line-space lever 51 is mounted upon the carriage-frame 15, and the parts operated by the push-bar 57 are mounted upon the shifting platen-frame 12, and to prevent any torsional strain in the platen-frame to disturb the alignment of the platen to the printing elements due to the line-space stopping feature between the gear sector stop 48 and the pinion 40, means are provided for a back support on the carriage to bear against a member of the paten-frame to resist any strain transmitted to the platen-carriage during a line-spacing operation. This means may include a bracket 79, adjustably secured to the carriage-frame at any convenient place, as by screws 80, and terminates at an upright section 81 with the edge face thereof bearing against a tie-rod 82 of the platen-frame. Any abnormal rearward movement of the platen-frame due to a line-spacing strain, will be arrested by the section 81 at either case-shift position of the platen-carriage.

It will be further noted that the present invention provides for a variable platen line-space mechanism that may be operated in the usual manner by a line-space lever for fixed line-space unit distances or multiples thereof; that the platen may be readily turned in either direction by the usual finger-knobs without interference from the variable spacing members; that the platen may be manually turned in either direction through minute distances independently of the line-space lever; that means are provided to automatically lock the clutch-members in operative engagement just prior to the end of the line-space movement to prevent independent movement of the platen from any source at the end of a line-spacing operation; that the clutch-members are separated by a very light spring that does not add material resistance to the manual turning of the platen; that the braking element for the loose clutch-member 32 coacts against the roughened periphery of said member and is also effective under a light spring tension; and that the gear-sector carries a stop to arrest the line-spacing movement of the line-space lever and also carries means to arrest the line-spacing movement of the platen.

It will also be noted that instead of shipping a multitude of loose parts for assembly to machines already in use, the frame 17, 18, 19 includes a factory assembled and adjusted unit that can be assembled to a machine as a unit; that the line-space lever with its fulcrum screw adjusting disk and the push-bar may be a factory-assembled unit also; that the plate 66, the lever 65, the detent lever 69, and its spring may also be a factory-assembled product to be adjusted to the machine as a unit; and that the entire line-spacing mechanism can be shipped to branch offices for assembly in three assembled units with a few simple instructions that can be readily understood by any repair-man familiar with the Underwood typewriting machine.

Variations may be resorted to within the scope of the invention, and portions of the improvements may be used without others.

Having thus described my invention, I claim:

1. A typewriting machine including a revoluble platen, a line-space lever having a fixed fulcrum, a slide movable upon said lever towards and away from the fulcrum of the lever and connected to the platen, to drive the same in line-spacing and means rotatably mounted upon the fulcrum of the line-space lever to adjust the slide microscopically to secure microscopic variations in the extent of the line-space unit of rotation of the platen for the same extent of vibration of the lever.

2. A typewriting machine including a revoluble platen, a line-space lever having a fixed fulcrum and formed with a slide-way radiating from the fulcrum thereof, a slide movable within the slideway towards and from the fulcrum of the lever and connected to drive the platen, and means mounted to rotate about the fulcrum of the line-space lever and operative to microscopically adjust and hold the adjusted slide to effect a microscopic variation in the extent of the line-space unit of throw of the slide to rotate the platen by a fixed line-spacing stroke of said lever.

3. A typewriting machine including a revoluble platen, a line-space lever having a fixed fulcrum, a slide adjustable upon said lever to vary the transmitted leverage to the platen, and means rotatably mounted and frictionally held upon the fulcrum of the line-space lever for microscopically adjusting the slide and holding the adjustment thereof to establish microscopic line-space units of rotation of the platen by the throw of the slide from a fixed normal position of said lever.

4. A typewriting machine including a revoluble platen, a line-space lever having a fixed fulcrum, a slide housed within said lever and slidable towards said fulcrum to vary the stroke of the slide, a platen-driving stud carried by the slide, connections between the stud and the platen, and carrying means rotatably mounted upon the fulcrum of the line-space lever and over the stud and operative to adjust the slide to secure microscopic variations in the line-space unit of throw of the stud to drive the platen from a line-spacing stroke of said lever that is uniformly the same for all adjustments of said stud.

5. A typewriting machine including a revoluble platen, a line-space lever having a fixed fulcrum, a slide movable towards and from the fulcrum of said lever to vary the stroke of the slide relatively to a fixed throw of said lever, a platen-driving stud carried by the slide and connected to line-space the platen, and a scroll camming means rotatably mounted upon the fulcrum of the line-space lever and over the slide and engageable with the stud to microscopically adjust and set the slide and microscopically predetermine a normal position for a line-space unit of throw of the stud in driving the platen in a line-spacing direction.

6. A typewriting machine including a revoluble platen, a line-space lever, a slide movable upon the lever and connected to the platen, a stud carried by the slide, and means rotatably mounted upon the line-space lever and including a spiral groove to engage with the stud to adjust the slide and predetermine a line-space unit of rotation for the platen.

7. A typewriting machine including a revoluble platen, a line-space lever, a slide mounted upon said lever and connected to the platen, mechanism mounted upon the line-space lever to adjust the slide and predetermine a line-space unit, and means to predetermine the sweep of the line-space lever for a line-spacing movement of the platen that is some multiple of the line-space unit.

8. A typewriting machine including a revoluble platen, a line-space lever, a slide mounted upon said lever and connected to the platen, mechanism mounted upon the line-space lever to adjust the slide and predetermine a line-space unit, a back stop for said lever, and means to shift the stop to predetermine the sweep of the line-space lever for a line-spacing movement of the platen that is some multiple of the line-space unit.

9. A typewriting machine including a revoluble platen, a line-space lever having a fixed forward stop, a slide mounted upon said lever and connected to the platen, mechanism mounted upon the line-space lever to adjust the slide and predetermine a line-space unit, a back stop for said lever, and means to adjust the back stop to predetermine the extent of swing for the line-space lever to the forward stop for a line-spacing movement of the platen that is some multiple of the line-space unit.

10. A typewriting machine including a revoluble platen, a line-space lever having a fixed fulcrum, a slide adjustable on said lever to determine a line-space unit of rotation of the platen, a platen-driving stud carried by the slide, driving connections between the stud and the platen, and indexing means mounted to rotate about the fulcrum of the line-space lever and co-operate with said stud to microscopically adjust the slide to secure microscopic variations in the extent of the line-space unit of rotation of the platen from a uniform sweep of the line-space lever.

11. A typewriting machine including a revoluble platen, a line-space lever, means settable to limit the swing of said lever for multiples of a line-space unit, a slide carried by said lever and connected to the platen, and means for minutely adjusting the slide relatively to said lever to determine a line-space unit of motion for the platen.

12. A typewriting machine including a revoluble platen, a line-space lever swingable about a fixed fulcrum to a fixed stop, a motion-transmitting element slidably mounted upon said lever and connected to the platen, and means mounted upon the fulcrum of said lever and settable independently thereof, to micrometrically adjust the angular relation between the transmitting element and the line-space lever to secure micrometric variations in the extent of throw of the platen from a fixed line-spacing throw of said lever.

13. A typewriting machine including a carriage and a revoluble platen, a line-space lever, a motion-transmitting element slidably mounted within said lever and connected to the platen, means mounted upon said lever and movable independently thereof, to minutely adjust the angular relation between the transmitting element and the line-space lever to predetermine a line-space unit of movement for the platen, and means mounted on the carriage to predetermine the swing of the line-space lever to rotate the platen a line-space distance equivalent to some multiple of the line-space unit.

14. A typewriting machine including a revoluble platen, a line-space lever, a normally inoperative platen-clutch including a pair of toothed elements brought together by the line-space lever to rotate the platen, and means to automatically lock the clutch-members together at the end of a line-spacing movement of the platen, to prevent independent movement of either clutch-element.

15. A typewriting machine including a revoluble platen, a line-space lever, a normally inoperative platen-clutch including a pair of toothed elements brought together by the line-space lever to rotate the platen, and means carried by the line-space lever and brought into co-operation by the swing of the line-space lever to interlock with the clutch-elements and arrest the platen at the end of a line-spacing movement, said clutch-elements self-releasing to permit the platen to remain stationary during the return of the line-space lever.

16. A typewriting machine including a revoluble platen, a line-space lever, a normally inoperative platen-clutch including a pair of separated toothed elements brought together by the line-space movement of said lever to drive the platen, and means brought into position by the line-spacing movement of the lever that interlock with the clutch-elements at the end of a line-spacing stroke to positively prevent rotation of the platen in either direction.

17. A typewriting machine including a revoluble platen and a line-space lever, a normally inoperative two-member clutch, one member permanently connected to the platen and the other member slidably connected to the line-space lever, means actuated by the initial swing of the line-space lever to bring the sliding clutch-member into clutching engagement with the fixed clutch-member, and means finally brought into position by the line-space lever in line-spacing the platen, to maintain the interlock between the clutch-member and positively check the line-spacing momentum of the platen.

18. A typewriting machine including a revoluble platen, a normally inoperative platen-clutch, a line-space lever, mechanism operated by the line-space lever to render the clutch operative to rotate the platen at the initial movement of the lever, and means automatically brought into action during the line-spacing of the platen, to prevent rotation of the platen independently of the line-space lever.

19. A typewriting machine including a revoluble platen, a normally inoperative platen-clutch, a line-space lever, mechanism actuated by the initial movement of the lever to render the clutch operative to rotate the platen, and means actuated by the lever and timed to the line-spacing movement of the platen, to interlock with the clutch and prevent rotation of the platen independently of the line-space lever.

20. A typewriting machine including a revoluble platen, a normally inoperative platen-clutch, a line-space lever, mechanism actuated by the initial movement of the lever to render the clutch operative to rotate the platen, and means actuated by the lever and timed to the line-spacing movement of the platen, to interlock with the clutch to prevent rotation of the platen in either direction at the end of the line-spacing operation.

21. A typewriting machine including a revoluble platen, a line-space lever, a gear-sector driven by said lever, a pinion rotated by the sector, a normally inoperative two-part clutch having one part connected to the pinion and the other part connected to the platen, mechanism to render the clutch operative to rotate the platen, and means carried by the sector to lock the two clutch-members together, at the end of a line-spacing operation.

22. A typewriting machine including a revoluble platen, a line-space lever, a gear-sector actuated by said lever, a pinion rotated by the sector, mechanism driven by the pinion to rotate the platen, a stop on the sector to arrest the line-spacing swing of the line-space lever, and means carried by the sector to arrest the line-spacing movement of the platen.

23. A typewriting machine including a revoluble platen, a line-space lever, a gear-sector actuated by said lever, a pinion rotated by the sector, mechanism driven by the pinion to rotate the platen, a stop on the sector to arrest the line-spacing swing of the line-space lever, and means carried by the sector to simultaneously arrest the line-spacing movement of the line-space lever and arrest the line-spacing movement of the platen.

24. A typewriting machine including a revoluble platen and a platen-shaft, a line-space lever, a gear-sector actuated by said lever, a vertically-disposed spindle, a pinion rotatable about the spindle and driven by the gear-sector, a normally inoperative two-part clutch, one part secured to the pinion and the other part secured to the spindle, reduction-gearing connecting the spindle to the platen-shaft, mechanism operated by the pinion to render the clutch operative to rotate the platen, and means carried by the sector to positively lock the two clutch-members together during the line-spacing operation.

25. A typewriting machine including a revoluble platen and a platen-shaft, a line-space lever, a gear-sector actuated by said lever, a vertically-disposed spindle, a pinion rotatable about the spindle and driven by the gear-sector, a normally inoperative two-part clutch, one part secured to the pinion and the other part secured to the spindle, reduction-gearing connecting the spindle to the platen-shaft, mechanism operated by the pinion to render the clutch operative to rotate the platen, and means carried by the sector to arrest the platen at the end of a line-spacing movement.

26. A typewriting machine including a revoluble platen and a platen-shaft, a line-space lever, a gear-sector connected to said lever, a vertically-disposed spindle, a pinion loose on the spindle and driven by the gear-sector, a two-part clutch, one part fixed to the spindle and the other part loose on the spindle, reduction-gearing connecting the spindle to the platen-shaft, means carried by the pinion to bring the two clutch-members into clutching engagement to rotate the platen, and means carried by the loose clutch-member to co-operate with the gear-sector to lock the two clutch-members together, at the end of the line-spacing operation.

27. A typewriting machine including a revoluble platen and a platen-shaft, a line-space lever, a gear-sector connected to said lever, a vertically-disposed spindle, a pinion loose on the spindle and driven by the gear-sector, a two-part clutch, one part fixed to the spindle and the other part loose on the spindle, reduction-gearing connecting the spindle to the platen-shaft, means carried by the pinion to bring the two clutch-members into clutching engagement to rotate the platen, a recess formed in the loose clutch-member, and means carried by the gear-sector and timed to enter the recess to lock the two clutch-members together, at the end of the line-spacing operation.

28. A typewriting machine including a revoluble platen and a platen-shaft, a line-space lever, a gear-sector connected to said lever, a vertically-disposed spindle, a pinion loose on the spindle and driven by the gear-sector, a two-part clutch, one part fixed to the spindle and the other part loose on the spindle, reduction-gearing connecting the spindle to the platen-shaft, means carried by the pinion to bring the two clutch-members into clutching engagement to rotate the platen, a recess formed in the loose clutch-member, and means carried by the gear-sector and timed to the rotation of the loose clutch-member to enter said recess and arrest the movement of the line-space lever.

29. A typewriting machine including a revoluble platen and a platen-shaft, a line-space lever, a gear-sector connected to said lever, a vertically-disposed spindle, a pinion loose on the spindle and driven by the gear-sector, a two-part clutch, one part fixed to the spindle and the other part loose on the spindle, reduction-gearing connecting the spindle to the platen-shaft, means carried by the pinion to bring the two clutch-members into clutching engagement to rotate the platen, a recess formed in the loose clutch-member, and means carried by the gear-sector and timed to the rotation of the loose clutch-member to enter said recess and simultaneously arrest the movement of the line-space lever and lock the two clutch-members together to arrest the rotation of the platen.

30. A typewriting machine including a revoluble platen and a platen-shaft, a line-space lever, a gear-sector connected to said lever, a spindle, a pinion loose on the spindle and driven by said sector, means connecting the spindle to the platen-shaft, a two-part clutch mounted upon the spindle, one part fixed to the spindle and the other part loose upon the spindle and normally inoperative to the other part, and means rotated by the pinion to render the clutch-elements operative, including a brake engaging the periphery of the loose clutch-member to prevent rotation thereof until said loose clutch-member is first brought into clutching engagement with the clutch-member fixed to the spindle.

31. A typewriting machine including a carriage and a shifting platen-frame mounted therein, a line-space lever mounted upon the carriage, a line-spacing mechanism mounted upon the platen-frame and operated by said lever, and means mounted upon the carriage and co-operative with the platen-frame to prevent a rearward distortion of the alignment of the platen from a line-spacing operation.

32. A typewriting machine including a carriage, a platen and a platen-driving rack, and a line-spacing mechanism wholly assembled within a frame and secured to the carriage as a unit, to co-operate with said rack to rotate the platen.

33. A typewriting machine including a carriage, a platen, a platen-driving rack and a line-space lever, and a line-spacing mechanism including a train of toothed elements assembled within a frame and secured to the carriage as a unit, to co-operate with said rack and line-space lever.

34. A typewriting machine including a carriage, a platen, a platen-driving rack and a line-space lever, and a line-spacing mechanism including a train of multiplying and reduction gearing connected by a clutch, assembled within a frame and secured to the carriage as a unit, to co-operate with the rack and operated by the line-space lever.

35. In a typewriting machine, means for minutely varying the extent of forward step-by-step line-spacing movements of a revoluble platen, including a line-space lever, a microscopically adjusted driving stud upon the lever, a drive train connecting the stud to the platen to drive the latter forwardly repeatedly a single line-space that microscopically varies in extent according to the variation in leverage afforded by the adjustment of said stud, and means mounted upon the line-space lever to adjust the stud, said train permitting the platen to remain stationary during the return of the lever to normal position.

36. A typewriting machine including a revoluble platen, a line-space lever movable to a fixed forward stop, platen-driving connections between the line-space lever and the platen, a scroll-cam co-operative with one part of the driving connections to predetermine the transmissive throw of the line-space lever for a single line-space unit, and a scroll-stop member operative to adjustably fix the intial position of the line-space lever relatively to the fixed stop to predetermine some multiple of the line-space unit.

BURNHAM C. STICKNEY.